Oct. 9, 1934.    C. C. GROTNES    1,975,939
WELD TRIMMING MACHINE
Filed Dec. 20, 1933    4 Sheets-Sheet 1

INVENTOR
Carl C. Grotnes
By Chindahl
Parker Carlson
ATTORNEYS

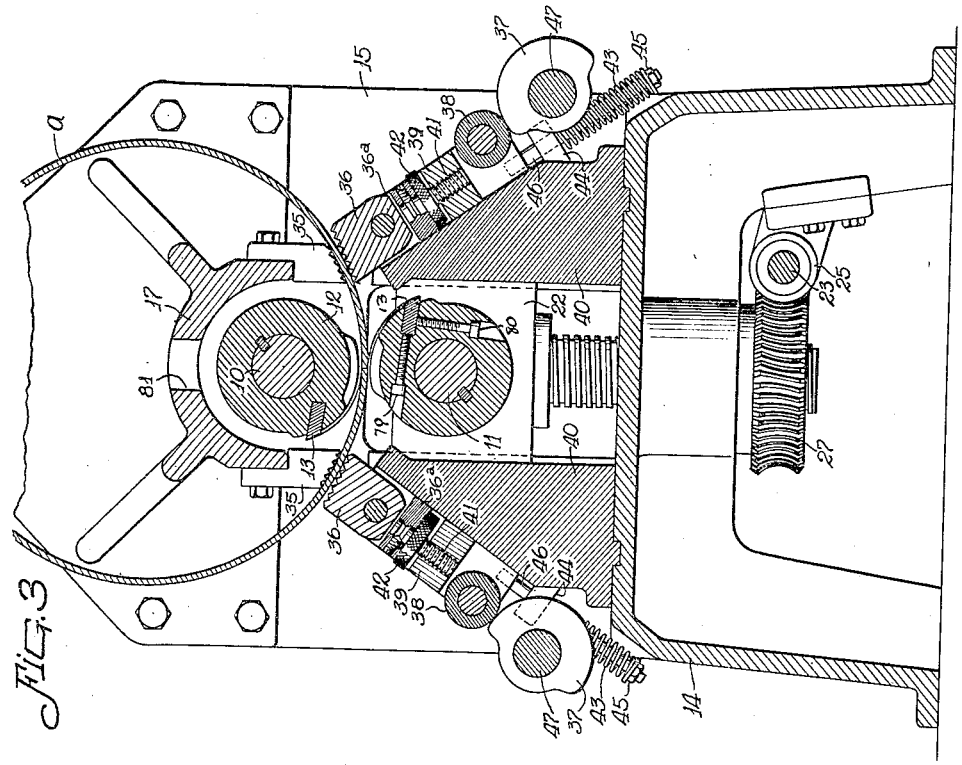

Oct. 9, 1934.  C. C. GROTNES  1,975,939
WELD TRIMMING MACHINE
Filed Dec. 20, 1933   4 Sheets-Sheet 3
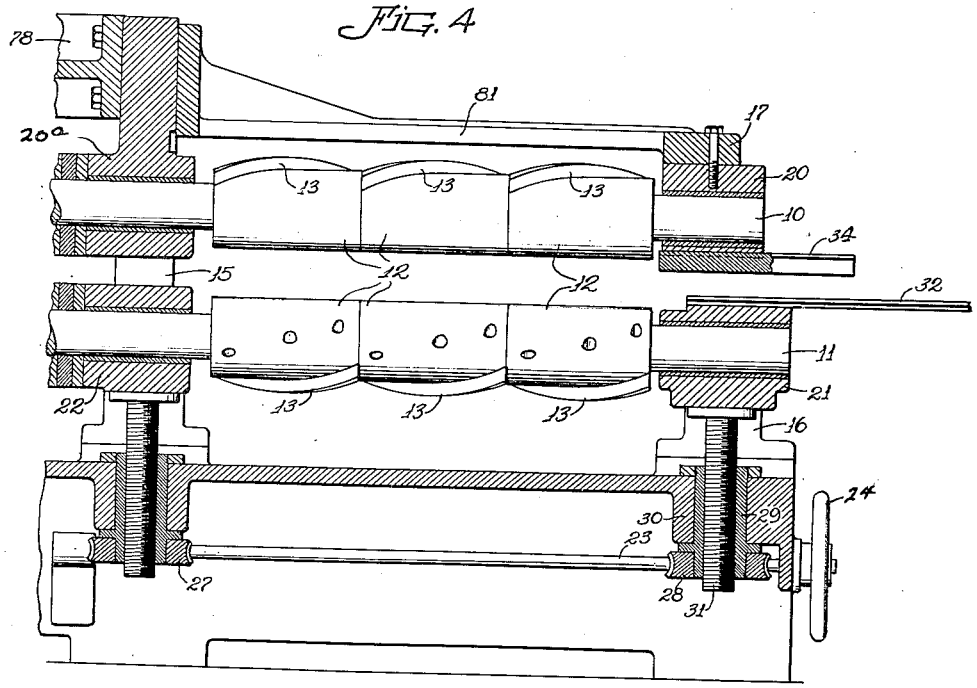
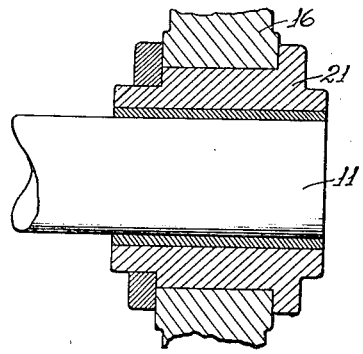
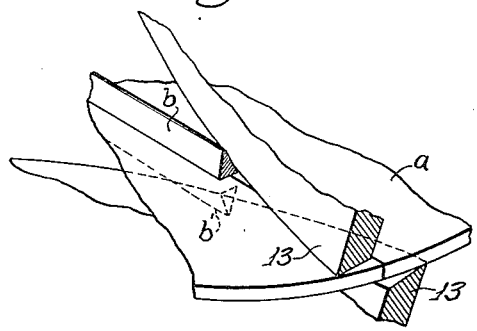
INVENTOR
Carl C. Grotnes
ATTORNEYS Oct. 9, 1934. C. C. GROTNES 1,975,939
WELD TRIMMING MACHINE
Filed Dec. 20, 1933 4 Sheets-Sheet 4
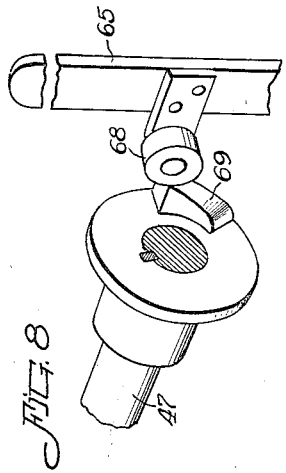
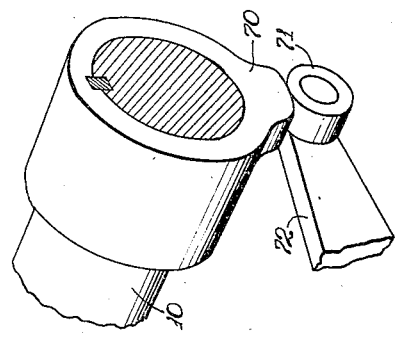
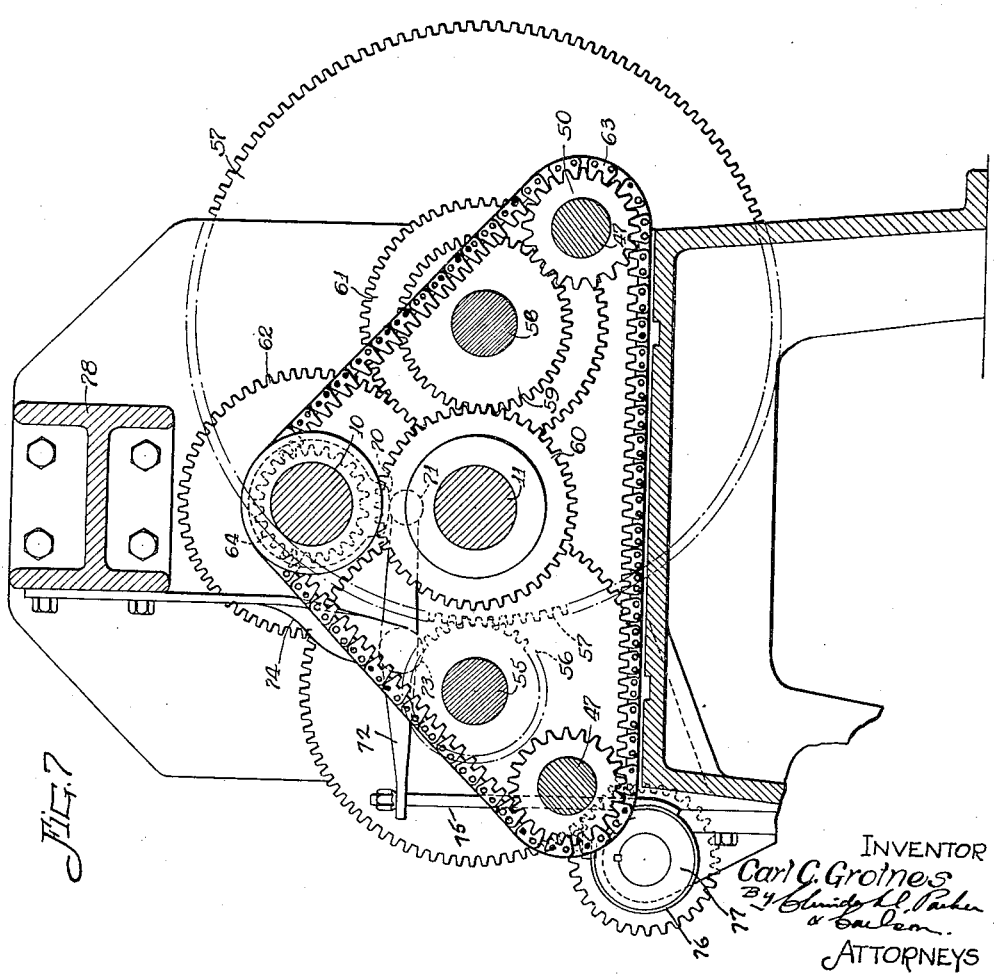
INVENTOR
Carl C. Grotnes
ATTORNEYS Patented Oct. 9, 1934

1,975,939

UNITED STATES PATENT OFFICE 1,975,939

WELD TRIMMING MACHINE

Carl C. Grotnes, Park Ridge, Ill.

Application December 20, 1933, Serial No. 703,203

22 Claims. (Cl. 164—66)

The invention pertains to a machine for trimming the flashings resulting from welding operations, and concerns more particularly the trimming of flashings incident to the butt welding of the edges of strips or sheets used in the construction of annular metallic articles, such as barrels, drums, automobile wheel rims, hub shells and the like.

The primary object of the invention is to reduce the cost of trimming weld flashings through the provision of a machine having rotatable shearing means capable of removing the flashings quickly and effectually.

Another object of the invention is to provide a machine having cutting means for weld flashings, of a character such as to avoid the necessity for frequent resharpening or renewal.

A further object is to provide for the simultaneous trimming of butt weld flashings projecting from opposite sides of the work.

A further object is to provide a weld trimming machine of the character indicated, which is especially adapted for use on work of an annular form such as sheet metal drums, barrels and the like.

A commonly experienced phenomenon in the art of making elongated annular articles such as metallic barrels is that as an incident to the welding of abutting edges, the metal has a tendency to bow somewhat along the longitudinal line of the welded joint, which bowing renders it difficult to trim the weld flashings by the methods heretofore employed. It is accordingly another object of my invention to provide cutting means of a character such as to straighten the metal during the cutting operation.

The objects of the invention thus generally stated, together with other and ancillary advantages are attained by a machine of the character illustrated in the accompanying drawings and hereinafter described, which machine is particularly adapted for trimming weld flashings on annular articles, such as sheet metal drums, and constitutes a preferred embodiment of my invention.

In the drawings:—

Fig. 2 is a transverse vertical sectional view, taken approximately in the plane of line 2—2 of Fig. 1 and illustrating the manner in which a metallic drum is guided into position in the machine.

Fig. 3 is a similar view taken in the plane of line 3—3 of Fig. 1 and illustrating the drum clamped in operative position.

Fig. 4 is a fragmentary longitudinal sectional view showing the shearing cutters in side elevation.

Fig. 5 is a fragmentary horizontal sectional view taken approximately in the plane of line 5—5 of Fig. 2, and illustrating an adjustable bearing for one of the cutter shafts.

Fig. 6 is a fragmentary perspective view illustrating the shearing operation.

Fig. 7 is a transverse sectional view taken approximately in the plane of line 7—7 of Fig. 1, and showing the drive mechanism.

Fig. 8 is a fragmentary perspective view showing a cam means for automatically actuating the clutch lever to terminate the operating cycle.

Fig. 9 is a similar view showing a cam means for actuating a brake mechanism at the end of the cycle.

Figure 1:
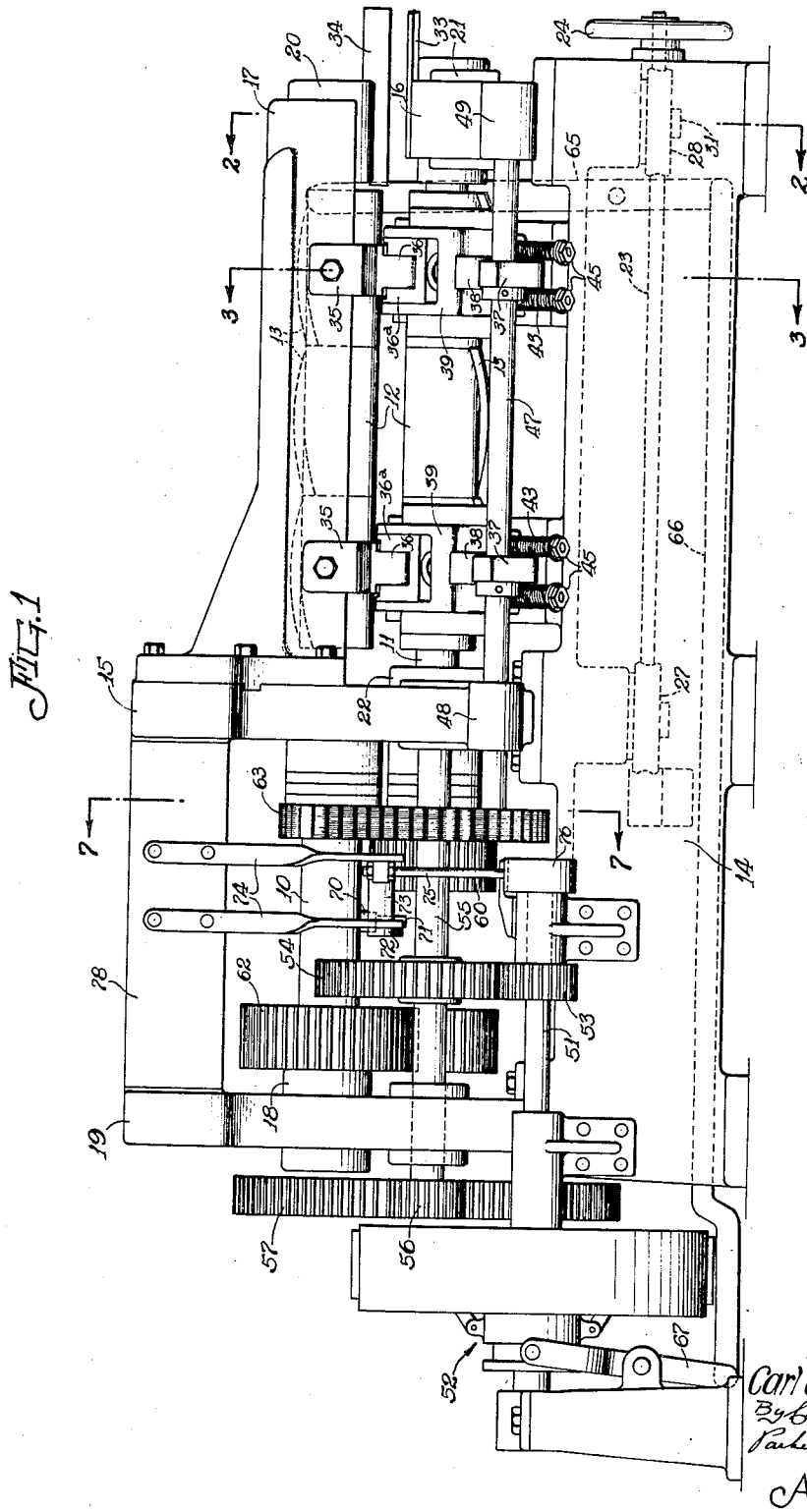
Figure 1 is a side elevational view of the machine.

In carrying out my invention, I employ cutting means operating with a shearing action on the weld flashings projecting from opposite sides of a piece of work along the joint. As above indicated, the machine is especially adapted to operate upon work of an annular character, such for example, as a metallic drum $a$ (Fig. 2), formed by rolling a flat sheet of metal into annular form and butt welding opposite edges of the sheet. In Figs. 2 and 6, $b$ and $b'$ respectively designate butt weld flashings projecting from the upper and lower sides of the welded joint, which flashings are removed by the shearing action of spiral cutting elements acting in opposition to each other on opposite sides of the work.

In the embodiment of the invention illustrated, the machine comprises a pair of cutter shafts 10 and 11 mounted one above the other in spaced parallel relation and each having keyed thereon a plurality of cutter heads 12 arranged in endwise relation and each equipped with a single spirally disposed cutting blade 13. In the present instance, three cutter heads are employed on each of the shafts 10 and 11 so as to provide three pairs of opposed heads, each pair having oppositely disposed or inclined blades for engagement simultaneously with the respective flashings $b$ and $b'$ on the work. Likewise, the several cutters on each shaft are similarly disposed circumferentially of their respective shafts so as to act simultaneously on different portions of the weld flashings longitudinally of the work. The blades extend only partially around their respective cutter heads, and the shafts are arranged to be driven at a uniform speed in the same direction to move the opposing blades in opposite directions.

The two shafts 10 and 11, with the cutter heads 12 fixed thereto, are rotatably supported in a main frame comprising an elongated base 14 having a central upright standard 15 rigidly mounted thereon, an end bracket 16 rigidly secured at one end of the base, which may be termed the forward end, and an overhanging arm 17. The latter is in the form of a rigid casting secured on one side of the standard 15 and projecting forwardly therefrom with its free end in overlying relation to the bracket 16.

The upper cutter shaft 10 extends rearwardly through the standard 15 and is supported in a bearing 18 mounted in a second standard 19 at the rear end of the base 14. At its forward end the shaft 10 is supported in an outboard bearing 20 carried by the free end of the over-arm 17, and intermediate its ends this shaft may have a bearing 20ᵃ in the standard 15.

The shaft 11 has its forward end supported in a bearing 21 mounted in the bracket 16, and near its opposite end it is supported in a bearing 22 in the central standard 15. This shaft 11 is continued rearwardly a short distance only beyond the standard 15, for operative association with the drive mechanism disposed between the two standards 15 and 19. Thus, the two shafts are mounted in spaced parallel relation in a manner such as to permit the insertion of the drum a to be operated upon between the opposed cutters.

To permit of the adjustment of the machine for operation upon work of varying thicknesses, the bearings 21 and 22 for the lower shaft are preferably mounted for vertical adjustment in unison. To this end, each of these bearings is in the form of a block slidably engaging its supporting frame member, the latter being provided with suitable openings providing ways in which the block is capable of moving vertically. For moving the blocks vertically, I provide an operating mechanism comprising a shaft 23 mounted in the base and extending longitudinally thereof with one end projecting from the forward end of the base and equipped with a handwheel 24. Said shaft 23 is equipped with two worms 25 and 26 respectively meshing with worm gears 27 and 28. Each of these gears in turn is keyed on the lower ends of a sleeve 29 mounted in a bearing 30 and internally threaded for engagement with a depending post 31 having its upper end rigid with the corresponding bearing block. By this construction, a substantial rotative movement imparted to the handwheel 24 is transmitted to the bearing blocks uniformly, in the form of a very slight movement. For example, the arrangement may be such that for one revolution of the handwheel the bearing blocks are adjusted 1/1000th of an inch.

To aid in positioning the work in the machine, I provide a rest in the form of two bars 32 and 33 (Figs. 1 and 2) which may be secured upon the upper side of the forward bearing block 21 in laterally spaced relation and projecting forwardly therefrom, the arrangement being such as to support the work for rearward movement into position between the opposed cutters. In such rearward movement, the work is guided by a longitudinal bar 34 mounted on the underside of the upper forward bearing block 20 and shaped to provide a depending guide rib terminating at its rear end adjacent the forward or outer ends of the cutters. In inserting the work between the cutters, the upper flashing b is guided along the rib 34. By this arrangement, the guided function of the rib 34 continues during practically the entire range of movement of the work into its operative position, the latter unguided portion of such movement being so small as to be negligible.

When the work has thus been inserted between the cutting means, it is preferably clamped in such position, and to this end, I provide two sets of longitudinally spaced clamping devices on opposite sides of the machine (Figs. 1 and 3). Each of these devices comprises a fixed clamping member or jaw 35 secured to one side of the over-arm 17, and a movable clamp member or jaw 36 slidable in a direction substantially radially of the work when in position and arranged for actuation by a cam 37 engageable with a roller follower 38 operatively associated with the movable jaw 36.

The fixed clamping member 35 is in the form of a block bolted to one side edge of the arm 17, which is shown in Fig. 3 as substantially semi-circular in cross section and spaced radially from the upper cutter heads 12. The movable jaw 36 is mounted for slight pivotal movement in a slotted head 36a which, in turn, is mounted in the slotted upper end of a block 39 guided for movement on a stationary supporting member 40 mounted on the base 14. In the slotted lower end of this block 39 is mounted the roller follower 38, and to permit of the adjustment of the clamping jaw 36 with respect to the roller follower 38, the block 39 is connected by a screw 41 with the jaw-carrying head 36ᵃ. On said screw is an operating collar 42. The follower 38 is held in engagement with its cam 37 by means of two coiled springs 43. These are interposed between stationary lugs 44 on the supporting member 39 and washers 45 on the lower ends of rods 46 disposed on opposite sides of the roller and anchored at their upper ends in the block 39.

To actuate the cams 37, cam shafts 47 are provided on opposite sides of the machine in bearings 48 and 49, two cams 37 being mounted on each of said shafts for operating the two clamping devices on the corresponding side of the machine. Each of the shafts 47 are extended rearwardly beyond the bearings 48, which are rigid with the central standard 15, and each carries a sprocket wheel 50 (Fig. 7) for driving purposes, as hereinafter set forth. It will, of course, be understood that the two shafts 47 are arranged to be driven in unison, and that the cams 37 thereon operate simultaneously to clamp the drum between the fixed jaws 35 and the movable jaws 36.

Referring now to Figs. 1 and 7, the drive mechanism herein employed for actuating the cutter shafts 10 and 11 and the cam shafts 47, comprises a main drive shaft 51 mounted on one side of the machine (Fig. 1), at the rear end thereof, and arranged to be connected with a suitable source of power by means of a clutch generally designated 52. On this shaft 51 is fast a spur pinion 53 meshing with a spur gear 54 fast on a shaft 55 journaled at its opposite ends in the standards 15 and 19. Rigid with the shaft 55 is a pinion 56 meshing with a gear 57 fast on a shaft 58 also journaled in said standards. The latter shaft has rigid therewith a pinion 59 meshing with a gear 60 fast on the lower cutter shaft 11. Also rigid with the shaft 58 is a gear 61 meshing with a gear 62 fast on the upper cutter shaft 10. The arrangement is such that both shafts are driven at the same speed, in the same direction, and it will be observed that the gearing connection between the shaft 58 and the lower cutter shaft 11 is such as to permit of the vertical adjustment of this latter shaft.

For driving the cam shafts 47, I provide a chain 63 travelling over the sprockets 50 on said shafts 47 and over a driving sprocket 64 on the upper cutter shaft 10.

A complete cycle of operation of the machine corresponds in the present instance to one complete revolution of each of the cutter shafts. In such cycle, the work having been inserted by the operator into position between the cutter heads, is first clamped by the operation of the movable clamping devices, in which operation the movable jaws 36 are moved upwardly by their respective cams 37 so as to clamp the work between such jaws and the stationary jaws 35. This clamping operation, of course, occurs during a partial revolution of the cutter heads and somewhat in advance of the engagement of the blades with the weld flashings b and b' on the work. As soon, however, as the work has been clamped, the several pairs of cutter blades engage the respective flashings simultaneously at different points longitudinally of the work, and in a further rotation of the cutter heads through a partial revolution, the blades operate to shear off the flashings. Near the end of the cycle, the cams 37 release the clamping devices to the action of the springs 45 so as to release the work, the machine being at this point brought to rest.

Preferably, means is provided for automatically stopping the machine at the end of each cycle. For this purpose, I provide cam means for actuating the main drive clutch 52 and for applying a brake to the drive shaft for stopping the machine at the proper time. The means for actuating the clutch (Figs. 1, 2 and 8) comprises a lever 65 pivotally mounted on the base and connected at its lower end by means of a link 66 with a clutch shifting lever 67. The lever 65 carries a roller 68 engageable by a cam 69 mounted on one of the cam shafts 47 (Fig. 1). The cam shafts 47 make one complete revolution in each operating cycle, and it will, therefore, be apparent that by properly positioning the cam 49 on its shaft, the clutch will be actuated in proper timed relation to the cycle to interrupt the driving operation.

The brake device for stopping the machine comprises in this embodiment, a cam 70 fast on the upper cutter shaft 10, as shown in broken lines in Fig. 7, and engageable with a roller 71 on one end of a lever 72 pivotally supported in a bearing bracket 73 suspended by a pair of hangers 74. The end of the lever opposite the roller 71 is connected by means of a rod 75 to a brake band 76 encircling a brake drum 77 fast on the main drive shaft 51. The hangers 74 may be conveniently supported from a tie bar 78 connecting the two standards 15 and 19 at their upper ends.

It will be observed that an important feature of my invention resides in the provision of cutters operating with a shearing action to remove the flashings, and further, in the arrangement by which the flashings projecting from opposite sides of the work are removed simultaneously. Also, it will be seen that by providing cutters composed of a plurality of longitudinally alined cutter heads having similarly disposed blades different portions of the flashings endwise of the work are removed at the same time. This reduces the operating time, it being apparent that the entire flashings are sheared during a portion only of one revolution of the cutter heads. By varying the number of such cutter heads in a machine, joints of different lengths can be accommodated. In some instances, where the length of the welded joint is short, a single cutter head may be sufficient; and obviously the cutter may be shaped to conform to different shapes of work.

In view of the use of a plurality of pairs of cutter heads operating on different portions of the work, it is desirable that the blades of adjacent cutters overlap slightly. Accordingly, the cutter heads are spaced apart a short distance as shown in Fig. 4 and the blades extended somewhat beyond the ends of the cutter heads.

A further advantage resulting from the operation of the cutters in a portion of a revolution thereof is that straight blades may be employed. As shown in Fig. 3, these blades are of the inserted tooth type, each of the heads being suitably grooved to receive a blade. The latter are adjustable in their grooves by means of screws 79, and are adapted to be clamped in position by means of screws 80 disposed perpendicular to the sides of the blades. For convenience of access to the screws of the upper cutter, a longitudinal slot 81 is provided in the arm 17 above the shaft 10. At the same time, access to the screws at the side of the head may be had beneath the arm.

Still, another advantage flowing from the use of shearing cutters of the character set forth, is that any previous bowing of the work along the line of the weld does not interfere with the effectual removal of the flashings. This is for the reason that the cutters necessarily operate during the cutting action to straighten the work.

It has been found that a machine constructed in accordance with the foregoing, serves not only to remove the flashings quickly and effectually, but is exceedingly durable in so far as the cutting blades are concerned. Prior methods commonly employed for removing flashings have usually involved the longitudinal movement of a cutting tool along the joint, and the experience has been that such tools quickly become dull requiring frequent resharpening and renewal. By virtue of the shearing action employed in my machine, the flashing is removed much more readily with correspondingly less wear on the blades.

Inasmuch as the cutting blades extend only partially around the cutter heads, a short operating cycle is made possible. Thus the actual trimming operation requires only a partial revolution of the cutters, so that the cycle may be terminated by the clutch and brake mechanism with the blades offset laterally from the operating position sufficiently to permit of the easy insertion of the work between the cutters.

I claim as my invention:

1. A weld trimming machine having, in combination, means for operating upon a piece of work having an elongated welded joint with a flashing projecting from one side thereof, including a rotary cutter held against axial movement and having a spiral cutting edge adapted to engage said flashing with a shearing action, and means for rotating said cutter, said cutting edge acting progressively from end to end thereof lengthwise of the flashing during a rotative movement of the cutter through not to exceed one revolution.

2. A weld trimming machine having, in combination, means for operating upon a piece of work having an elongated welded joint with flashings projecting laterally from opposite sides thereof, including two rotary cutters held against axial movement and having oppositely disposed spiral cutting edges adapted to engage with the respective flashings substantially simultaneously, and means for rotating said cutters, each of said cutting edges acting progressively from end to end thereof lengthwise of the joint during the rotation of the cutters through less than one revolution.

3. A weld trimming machine having, in combination, means for operating upon a piece of work having an elongated welded joint with a flashing projecting from one side thereof, including a rotary cutter held against axial movement and having a plurality of spirally disposed cutting edges adapted to engage said flashing with a shearing action substantially simultaneously at different points along the joint, means for holding the work stationary, and means for rotating said cutter, said cutting edges acting progressively from end to end thereof endwise of the flashing during the rotation of the cutter.

4. A weld trimming machine having, in combination, means for operating upon a piece of work having an elongated welded joint with a flashing projecting therefrom, including a rotary cutter held against axial movement and having a spiral cutting edge adapted to engage said flashing with a shearing action, driving means for rotating said cutter, said cutting edge acting progressively from end to end thereof lengthwise of the flashing during rotative movement of the cutter through less than one revolution, and means operating automatically to interrupt said driving means with said cutting edge offset laterally relative to said joint.

5. A weld trimming machine having, in combination, means for supporting an annular piece of work having a longitudinal joint in one side with a flashing projecting laterally from the joint, and a cutter mounted for rotation on an axis parallel with the axis of the work and having a plurality of straight cutting blades with spiral cutting edges operating simultaneously to remove the flashing with a shearing action.

6. In a machine for operating upon a piece of work having a welded butt joint with flashings projecting laterally from opposite sides of the joint, means simultaneously engaging the oppositely projecting flashings at opposite sides thereof and including two elements respectively disposed on opposite sides of the work and oppositely engaging the respective flashings, one of said elements comprising a rotary cutter having a cutting edge inclined relative to said joint and operable to remove the flashing on the corresponding side of the work with a shearing action.

7. In a machine for operating upon a piece of work having a welded butt joint, with flashings projecting laterally from opposite sides of the joint, two rotary cutters mounted in spaced parallel relation to receive the work between them and having straight cutting blades with oppositely spiralled cutting edges on opposite sides of the work, and means for rotating said cutting elements to move said blades simultaneously in opposite directions relative to the work whereby to remove said oppositely projecting flashings simultaneously with a shearing action.

8. In a machine for operating upon annular articles formed from a flat sheet of metal with a longitudinal butt welded joint having flashings projecting laterally therefrom; a pair of rotary cutter heads mounted in spaced relation to receive the work with its welded joint between them, said cutter heads having oppositely spiralled cutting elements, and means for rotating said heads to carry said elements simultaneously into engagement with the oppositely projecting flashings to remove the same by a shearing action.

9. A weld trimming machine having two opposed cutters, each comprising a plurality of cutter heads arranged in endwise relation so as to form a plurality of pairs of laterally opposed cutter heads adapted to receive between them a piece of work having a welded joint with laterally projecting flashings, each pair of heads having cutting elements simultaneously acting in opposed relation upon flashings on opposite sides of the work.

10. A weld trimming machine having two opposed cutters, each comprising a plurality of cutter heads arranged in endwise relation so as to form a plurality of pairs of opposed cutter heads spaced apart laterally so as to receive between them a piece of work having a welded joint with laterally projecting flashings, each of said heads having a cutting blade with a cutting edge extending beyond the head in the direction of the next axially adjacent head and the cutting elements of the several pairs of heads being arranged to operate simultaneously in opposed relation on different portions of the work longitudinally of said joint.

11. A weld trimming machine having, in combination, means for supporting a piece of work having a welded joint with a flashing projecting from one side thereof, a rotary cutter head having a single straight blade with a spiral cutting edge for operating on said flashing with a shearing action, and means for rotating said head on an axis substantially parallel with said point.

12. A weld trimming machine having, in combination, means for clamping a piece of work having an elongated welded joint with a flashing projecting laterally therefrom, rotary cutting means adapted to engage said flashing progressively with a shearing action, and a drive mechanism for actuating said clamping and cutting means, said cutting means being operative in less than one complete revolution to remove the flashing, and said clamping means being operative to clamp and unclamp the work in the initial and final portions respectively of such revolution.

13. A weld trimming machine having, in combination, means for clamping a piece of work having an elongated welded joint with a flashing projecting laterally therefrom, trimming means including a cutter adapted to engage said flashing progressively, and to drive mechanism having an automatically operating control means for actuating said clamping and trimming means through a predetermined operating cycle, said cutter being operative in an intermediate portion of the cycle to remove the flashing, and said clamping means being operative at the beginning and end of the cycle to clamp and unclamp the work.

14. A weld trimming machine having, in combination, means for operating upon a piece of work having an elongated welded joint with a flashing projecting laterally therefrom, including a rotary cutter adapted to engage said flashing progressively with a shearing action, and means for clamping the work during the operation of the cutter, said clamping means comprising a plurality of laterally spaced clamping devices each including a fixed clamping member engageable with one side of the work, a movable clamping member engageable with the other side of the work, and cam means for actuating said movable clamping member.

15. A weld trimming machine having, in combination, means for operating upon an annular piece of work having an elongated welded joint with a flashing projecting laterally therefrom, including a rotary cutter adapted to engage said flashing progressively with a shearing action, and means for clamping the work in position during the operation of the cutter comprising a pair of clamping devices disposed on opposite sides of the cutter and each having a stationary clamping jaw for engagement by the inner side of the work, a movable clamping jaw engageable with the outer side of the work and movable toward and from the fixed jaw in a direction substantially radially of the work, and cam means for actuating the movable jaw.

16. A weld trimming machine having, in combination, means for operating upon an annular piece of work having an elongated welded joint with a flashing projecting laterally therefrom, including two cutters mounted in spaced parallel relation and having oppositely disposed spiral cutting edges adapted to engage simultaneously the flashing on opposite sides of the work, means for clamping the work during the operation of said cutters, and a main drive mechanism for rotating said cutters, said clamping means comprising a pair of clamping devices on opposite sides of the cutters, and cam means actuated by said main drive mechanism for operating said clamping devices in timed relation to the rotation of the cutters.

17. A weld trimming machine having, in combination, a main supporting frame, a pair of rotary cutters, means on said frame supporting said cutters in parallel relation with a space between the cutters open at one end to permit the insertion therebetween of a piece of work having a longitudinal welded joint with laterally projecting flashings disposed substantially in a plane passing through the axes of the cutters, and means for rotating the cutters, said cutters having oppositely disposed spiral cutting blades respectively adapted to engage the flashings on opposite sides of the work substantially simultaneously and acting progressively from end to end of the blades lengthwise of the flashings during the rotation of said cutters.

18. A weld trimming machine having, in combination, a main supporting frame, a pair of rotary cutters, means on said frame supporting said cutters in parallel relation with a space between the cutters open at one end to permit the insertion therebetween of a piece of work having a longitudinal welded joint with laterally projecting flashings on opposite sides of the joint, means for clamping said work in position between the cutters with said joint disposed substantially in a plane passing through the axes of the cutters, and means for rotating the cutters, said cutters having oppositely disposed spiral cutting blades respectively adapted to engage the flashings on opposite sides of the work substantially simultaneously and acting progressively from end to end of the blades lengthwise of the flashings during the rotation of said cutters.

19. A weld trimming machine having, in combination, a main supporting frame, two rotary cutters, means on said frame for supporting said cutters in parallel relation with a space between the cutters open at one end to permit the insertion therebetween of a piece of work having a welded joint with laterally projecting flashings extending between the cutters substantially parallel thereto, a stationary guide bar supported by the frame and adapted to be engaged by one of said flashings during the insertion of the work between the cutters, and means for rotating the cutters, said cutters having oppositely disposed spiral cutting edges respectively adapted to engage the opposite flashings and acting progressively with a shearing action from end to end of the cutters during the rotation thereof.

20. A weld trimming machine having, in combination, a main supporting frame, two rotary cutters, means on said frame for supporting said cutters in parallel relation with a space between the cutters open at one end to permit the insertion therebetween of a piece of work having a welded joint with laterally projecting flashings extending between the cutters substantially parallel thereto, means for rotating the cutters, said cutters having oppositely disposed spiral cutting edges respectively adapted to engage the opposite flashings and acting progressively with a shearing action from end to end of the cutters during the rotation thereof, and manually operable means for adjusting one of said cutters bodily toward and from the other cutter.

21. A weld trimming machine having, in combination, a main supporting frame, two rotary cutters mounted in spaced parallel relation in said frame one above the other, said frame having an upright standard having an overarm projecting laterally therefrom, bearings for said cutters including two fixed bearings for the upper cutter respectively mounted in said standard and in the end of said overarm and two bearings for the lower cutter mounted on the frame for vertical movement, said cutters being adapted to receive between them a piece of work having laterally projecting weld flashings disposed substantially in a plane passing through the axes of the cutters, means for rotating the cutters, and means for adjusting said lower bearings comprising a manually operable shaft, a pair of threaded stems connected with each of said movable bearings, and means operatively associated with said stems and acting in the rotation of said shaft through a substantial distance to impart a relatively slight movement to said movable bearings.

22. A weld trimming machine having, in combination, a main supporting frame, two rotary cutters mounted in spaced parallel relation in said frame one above the other, said frame having an upright standard and an overarm projecting horizontally from the standard, and bearings for said cutters including a bearing in the end of said overarm, whereby to support the cutters to permit the insertion of a piece of work therebetween, means mounted on the frame at opposite sides of the cutters for clamping between them a piece of work having laterally projecting flashings disposed substantially in a plane passing through the axes of said cutters, and means for rotating the cutters, said cutters having oppositely disposed spiral cutting edges respectively adapted to engage said flashings and acting progressively from end to end thereof lengthwise of the flashings during the rotation of said cutters.

CARL C. GROTNES.